United States Patent
Cvet et al.

(10) Patent No.: US 10,931,615 B1
(45) Date of Patent: Feb. 23, 2021

(54) ORGANIZING SELF-REPLYING MESSAGES

(71) Applicant: Twitter, Inc., San Francisco, CA (US)

(72) Inventors: Michael Cvet, San Francisco, CA (US); Elif Dede, San Francisco, CA (US); Tommy Chong, San Francisco, CA (US); Goran Peretin, San Francisco, CA (US); Michael J. Matczynski, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 0 days.

(21) Appl. No.: 16/218,413

(22) Filed: Dec. 12, 2018

(51) Int. Cl.
*H04L 12/58* (2006.01)
*H04W 4/12* (2009.01)

(52) U.S. Cl.
CPC .............. *H04L 51/16* (2013.01); *H04L 51/32* (2013.01); *H04W 4/12* (2013.01)

(58) Field of Classification Search
None
See application file for complete search history.

(56) References Cited

U.S. PATENT DOCUMENTS

| | | | |
|---|---|---|---|
| 7,110,510 B1 | 9/2006 | Shaffer et al. | |
| 7,421,690 B2 | 9/2008 | Forstall et al. | |
| 8,332,477 B1* | 12/2012 | Kaiserlian | G06F 16/338 709/206 |
| 2004/0185883 A1 | 9/2004 | Rukman | |
| 2010/0087169 A1 | 4/2010 | Lin et al. | |
| 2015/0222572 A1* | 8/2015 | Vendrow | H04L 51/02 715/752 |
| 2016/0364368 A1* | 12/2016 | Chen | H04L 51/16 |
| 2018/0225784 A1* | 8/2018 | Ashokan | H04L 51/16 |
| 2019/0117142 A1* | 4/2019 | Moskowitz | H04L 51/32 |
| 2019/0244178 A1* | 8/2019 | Carter | G06Q 10/107 |
| 2019/0281001 A1* | 9/2019 | Miller | G06N 20/00 |
| 2019/0327198 A1* | 10/2019 | Connor | H04L 51/16 |

FOREIGN PATENT DOCUMENTS

WO    WO-2015132342 A1 *    9/2015    ......... G06F 16/3334

OTHER PUBLICATIONS

Blog.twitter.com [online], "Nice Threads," Dec. 12, 2017, [retrieved on Dec. 12, 2018], retrieved from URL: <https://blog.twitter.com/official/en_us/topics/product/2017/nicethreads.html>, 3 pages.

* cited by examiner

*Primary Examiner* — Chris Parry
*Assistant Examiner* — Abderrahmen Chouat
(74) *Attorney, Agent, or Firm* — Fish & Richardson P.C.

(57) ABSTRACT

Methods and systems for generating, identifying, and displaying message threads on a social messaging platform. One of the methods includes receiving a first and second messages posted to a social messaging platform by a user account; determining whether the second message is a reply to the first message posted by the user account; in response, determining if the first message is part of an existing message thread; in response to determining that the first message is not part of an existing thread, assigning a new thread identifier to both the first message and the second message, the thread identifier associating both messages with a new thread; in response to determining that the first message is part of an existing thread, assigning an existing thread identifier obtained from the first message to the second message.

24 Claims, 12 Drawing Sheets

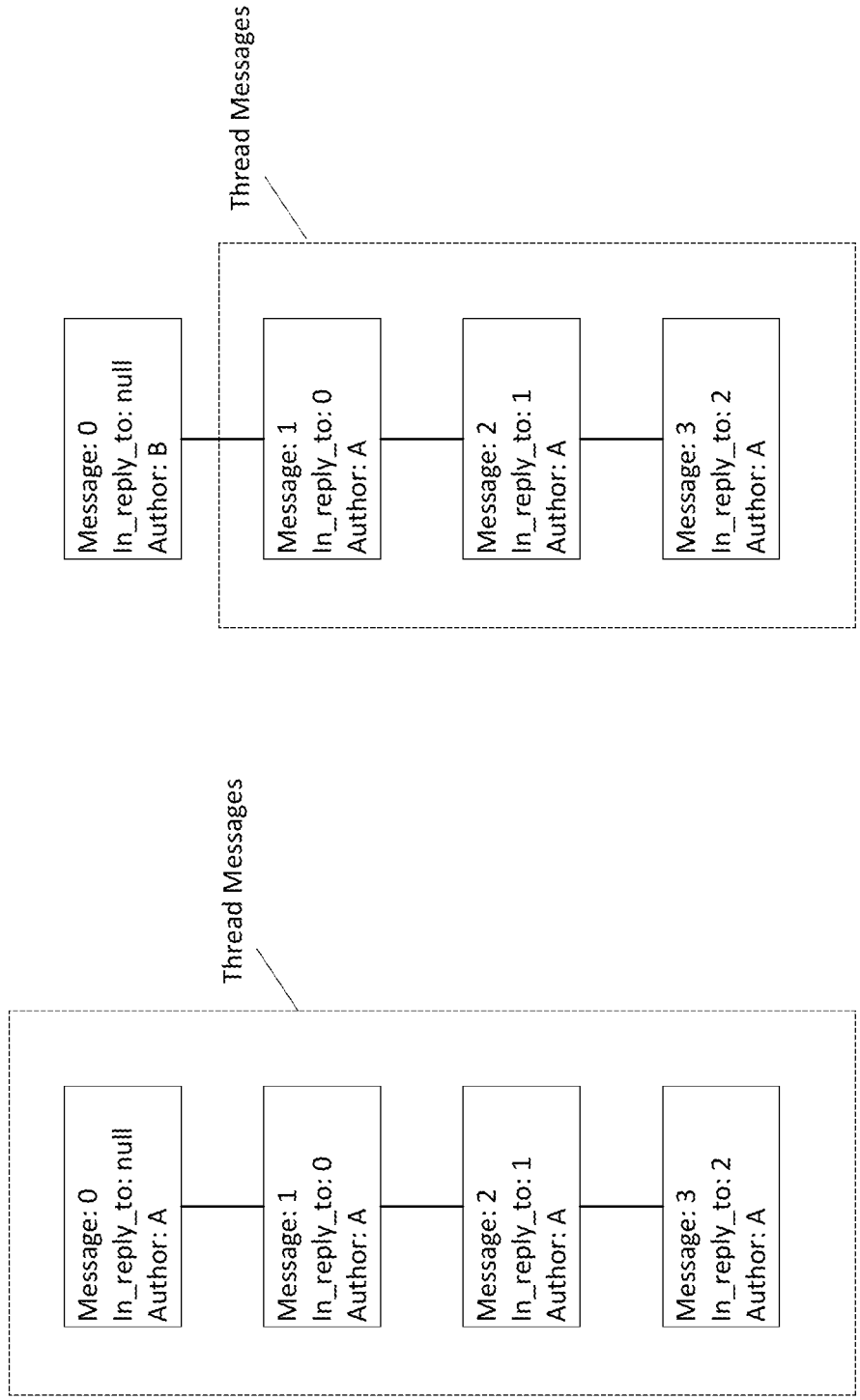

ORGANIZING SELF-REPLYING MESSAGES

BACKGROUND

This specification relates to generating, identifying, and displaying message threads on a social messaging platform.

Social messaging platforms and network-connected personal computing devices allow users to create and share content across multiple devices in real-time.

Sophisticated mobile computing devices such as smartphones and tablets make it easy and convenient for people, companies, and other entities to use social messaging platforms and applications. Popular social messaging platforms generally provide functionality for users to draft and post messages, both synchronously and asynchronously, to other users. Other common features include the ability to post messages that are visible to one or more identified other users of the platform, or even publicly to any user of the platform without specific designation by the authoring user.

SUMMARY

This specification describes technologies for generating, identifying, and displaying message threads on a social messaging platform. Specifically, these technologies generally allow a user of a social messaging platform to generate cohesive content spanning across multiple messages including: posting a root message, posting a reply message to the root message, and, optionally, posting additional reply messages to the root message or other reply messages. In some implementations, a thread can be generated during message composition by user. In some other implementations, the social messaging platform can identify self-reply threads by analyzing posted message. In particular, the system can identify the relationship between messages to determine whether the messages include self-replies by a same user account. Message threads can be provided for presentation to the user in a manner that identifies the content as belonging to a thread.

In general, one innovative aspect of the subject matter described in this specification can be embodied in methods that include the actions of receiving a first message posted to a social messaging platform by a user account; receiving a second message posted to the social messaging platform the by user account; determining whether the second message is a reply to the first message posted by the user account; in response to determining that the second message is a reply to the first message by the user account, determining if the first message is part of an existing message thread; in response to determining that the first message is not part of an existing thread, assigning a new thread identifier to both the first message and the second message, the thread identifier associating both messages with a new thread; in response to determining that the first message is part of an existing thread, assigning an existing thread identifier obtained from the first message to the second message; and in response to a request to display a timeline for a particular user account of the social messaging platform that includes the first message or the second message, providing a representation of the thread including the first message and the second message for presentation on the timeline.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. Determining if the first message is part of an existing thread includes determining whether a valid message thread identifier is assigned to a thread metadata field for the first message. Determining whether the second message is a reply to the first message by the user account includes: obtaining a reply-to identifier associated with the second message; obtaining a message identifier of the first message; comparing the reply-to identifier with the message identifier; and comparing a message author identifier of the first message to a message author identifier of the second message. The method further includes: receiving a third message; determining that the third message is a reply to one of the first message or the second message; and assigning the thread identifier of the first and second message to the third message. The third message is a reply to the first message such that the resulting thread includes branching. Providing the thread for presentation on a timeline includes determining number of messages in the thread and providing a compressed representation of the thread in response to determining that the number of messages in the thread exceeds a specified number. The method includes in response to determining that the first message is not part of an existing thread, determining if the first message is a root message; and in response to determining that the first message is a root message, assigning the new thread identifier to both the first message and the second message.

Particular embodiments of the subject matter described in this specification can be implemented in particular embodiments so as to realize one or more of the following advantages. A social messaging platform can increase user participation on the social messaging platform by hosting more engaging and expressive content. The social messaging platform can identify threaded content to provide to users in a more clear and readable format. A user of the platform can benefit from an improved user experience with long and dense content divided into a more readable message thread. An author on the platform can benefit from creating content unrestricted by the word limit of a single message. A user can share or respond to a thread of messages instead of to individual messages in it. An author can append new content to a thread at a later time and other social network users who saved the thread previously will get the updated content.

The details of one or more embodiments of the subject matter of this specification are set forth in the accompanying drawing and description below. Other features, aspects, and advantages of the subject matter will become apparent from the description, the drawings, and the claims.

BRIEF DESCRIPTIONS OF THE DRAWINGS

FIGS. 5A-5D are example message threads having different structures.

Specific embodiments of the invention will now be described in detail with reference to the accompanying figures. Like elements in the various figures are denoted by like reference numerals for consistency.

DETAILED DESCRIPTION

Figure 1:
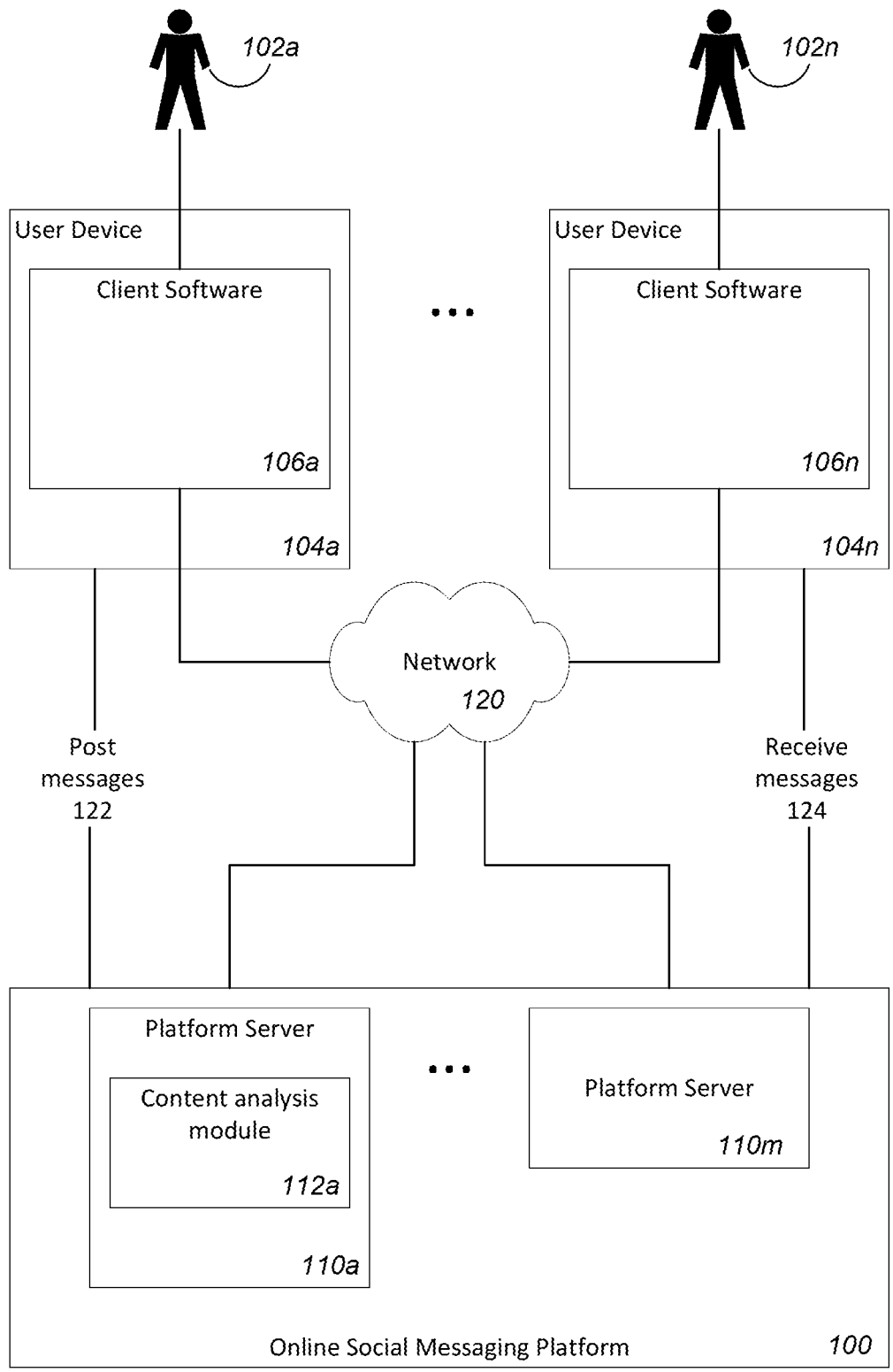
FIG. 1 illustrates an example online social messaging platform.

FIG. 1 illustrates an example online social messaging platform 100 and example user devices 104a-104n configured to interact with the platform over one or more data communication networks 120. The platform, the user devices, or both are configured, as will be described, to implement or perform one or more of the innovative technologies described in this specification.

The platform is implemented on one or more servers 110a-110m. Each server is implemented on one or more computers, e.g., on a cluster of computers. One or more of the servers implement a content analysis module 112a configured to generate and manage message threads, which will be described later.

Users

Users 102a-102n of the platform use user devices 104a-104n, on which client software 106a-106n is installed, to use the platform. Users can interact with the social messaging platform using the respective client software on their respective user devices.

A user may be account holder of an account, or an authorized user of an account, on the platform. The platform may have millions of accounts of individuals, businesses, or other entities, e.g., pseudonym accounts, novelty accounts, and so on.

User Device and Client Software

A user device can be any Internet-connected device, e.g., a laptop or desktop computer, a smartphone, or an electronic tablet. The user device can be connected to the Internet through a mobile network, through an Internet service provider (ISP), or otherwise.

Each user device is configured with software, which will be referred to as a client or as client software 106a-106n, that in operation can access the platform so that a user can post and receive messages, view and curate the user's streams, and view and interact with lists of content items. On any particular user device, the client may be a web browser or an HTML (hypertext markup language) document rendered by a web browser. Or the client may be JavaScript code or Java code. Or the client may also be dedicated software, e.g., an installed app or installed application, that is designed to work specifically with the platform. Or the client may be or include a Short Messaging Service (SMS) interface, an instant messaging interface, an e-mail-based interface, or an API function-based interface, for example.

Platform

The social messaging platform 100 is implemented on one or more computers in one or more locations that operate as one or more servers that support connections over wired or wireless networks 120 from many different kinds of user devices. The platform may have many millions of accounts, and anywhere from hundreds of thousands to millions of connections may be established or in use between clients and the platform at any given moment.

The platform facilitates real-time communication. The platform and client software are configured to enable users to use the platform to post messages 122 to the platform and to use the platform to receive messages 124 posted by other users.

The platform is configured to provide content, generally messages, to a user in a home feed message stream. The messages will generally be messages from accounts the user is following, meaning that the recipient has registered to receive messages posted by the followed account, and optionally content that such accounts have engaged with, e.g., endorsed. Optionally, the platform is configured to include in a recipient user's home feed stream messages that the platform determines are likely to be of interest to the recipient, e.g., messages on topics of particular current interest, as represented by the number of messages posted on the topics platform users, or messages posted on the topics of apparent interest to the recipient, as represented by messages the recipient has posted or engaged with, as well as selected advertisements, public service announcements, promoted content, or the like.

The platform is configured to enable users to exchange messages in real-time, i.e., with a minimal delay. The platform is also configured to enable users to respond to messages posted earlier, on the order of hours or days or even longer. The platform is configured to display posted messages to one or more other users within a short time frame so as to facilitate what can essentially be a live conversation between the users.

Thus, the basic messaging functionality of the platform includes at least posting new messages, providing message streams on client request, managing accounts, managing connections between accounts, messages, and streams, and receiving engagement data from clients engaging with messages. The platform also indexes content items and access data and can provide the indexed data to account holders.

Messages

In some implementations of the platform, a message contains data representing content provided by the author of the message. The message may be a container data type storing the content data. The types of data that may be stored in a message include text, graphics, images, video, and computer code, e.g., uniform resource locators (URLs), for example. Messages can also include key phrases, e.g., hashtags, that can aid in categorizing or relating messages to topics. Messages can also include metadata that may or may not be editable by the composing account holder, depending on the implementation. Examples of message metadata include a time and date of authorship and a geographical location of the user device when it submitted the message. In some implementations, what metadata is provided to the platform by a client is determined by privacy settings controlled by the user or the account holder.

Messages composed by one account holder may reference other accounts, other messages, or both. For example, a message may be composed in reply to another message composed by another account. A message may also be composed by a user in reply to a message originally posted by the user. Messages may also be reposts of a message composed by and received from another account.

In some implementations, messages are microblog posts, which differ from e-mail messages, for example, in that an author of a microblog post does not necessarily need to specify, or even know, who the recipients of the message will be.

The content analysis module 112a includes functionality to identify one or more grouping criteria for grouping messages into threads. For example, the grouping criteria may be used to identify content associated with a user account and associated with replies from the same user account. The grouping criteria can be used to identify messages belonging to the same message thread, as described below.

Streams

A stream is a stream of messages on the platform that meet one or more stream criteria. A stream can be defined by the stream criteria to include messages posted by one or more accounts. For example, the contents of a stream for a requesting account holder may include one or more of (i) messages composed by that account holder, (ii) messages composed by the other accounts that the requested account holder follows, (iii) messages authored by other accounts that reference the requested account holder, or (iv) messages sponsored by third parties for inclusion in the account holder's message stream. The messages of a stream may be ordered chronologically by time and date of authorship, or reverse chronologically. Streams may also be ordered in other ways, e.g., according to a computationally predicted relevance to the account holder, or according to some combination of time and relevance score.

A stream may potentially include a large number of messages. For both processing efficiency and the requesting account holder's viewing convenience, the platform generally identifies a subset of messages meeting the stream criteria to send to a requesting client once the stream is generated. The remainder of the messages in the stream are maintained in a stream repository and can be accessed upon client request.

Relationships

Accounts will in general have relationships with other accounts on the platform.

Relationships between accounts of the platform are represented by connection data maintained by the platform, e.g., in the form of data representing one or more connection graphs. The connection data may be maintained in a connection repository. A connection graph includes nodes representing accounts of the platform and edges connecting the nodes according to the respective relationships between the entities represented by the nodes. A relationship may be any kind of association between accounts, e.g., a following, friending, subscribing, tracking, liking, tagging, or other relationship. The edges of the connection graph may be directed or undirected based on the type of relationship.

Engagement

In some implementations, the platform tracks engagement with messages. In some implementations, the platform maintains, in a message repository, data that describes each message as well as the engagement with each message.

Engagement data can include any type of information describing user activity related to a message by an engaging account of the platform. Examples of engagement by a user include, for example, reposting the message, marking the message to indicate is a favorite of, liked by, or endorsed by the user, responding to the message, and mentioning or referencing the message. Engagement data may also include how many followers, connections, and/or friends of the context account have connections with the engaging account, e.g., are in a connection graph of the engaging account, or an indication that the context account is a favorite account of the engaging account.

Services Provided by Platform Servers

The servers of the platform perform a number of different services that are implemented by software installed and running on the servers. The services will be described as being performed by software modules. In some cases, particular servers may be dedicated to performing one or a few particular services and only have installed those components of the software modules needed for the particular services. Some, modules will generally be installed on most or all of the non-special-purpose servers of the platform. The software of each module may be implemented in any convenient form, and parts of a module may be distributed across multiple computers so that the operations of the module are performed by multiple computers running software performing the operations in cooperation with each other. In some implementations, some of the operations of a module are performed by special-purpose hardware.

Front End Services

In some implementations, the platform includes numerous different but functionally equivalent front end servers, which are dedicated to managing network connections with remote clients.

The front end servers provide a variety of interfaces for interacting with different types of clients. For example, when a web browser accesses the platform, a web interface module in the front end module provides the client access. Similarly, when a client calls an API made available by the platform for such a purpose, an API interface provides the client access.

The front end servers are configured to communicate with other servers of the platform, which carry out the bulk of the computational processing performed by the platform as a whole.

Routing Services

A routing module stores newly composed messages in a message repository. The routing module also stores an identifier for each message. The identifier is used to identify a message that is to be included in a stream. This allows the message to be stored only once and accessed for a variety of different streams without needing to store more than one copy of the message.

Relationship Graph Services

A graph module manages connections between accounts. Connections determine which streams include messages from which accounts. In some implementations, the platform uses unidirectional connections between accounts and streams to allow account holders to subscribe to the message streams of other accounts. A unidirectional connection does not necessarily imply any sort of reciprocal relationship. An account holder who establishes a unidirectional connection to receive another account's message stream may be referred to as a "follower," and the act of creating the unidirectional connection is referred to as "following" another account.

Delivery Services

A delivery module constructs message streams and provides them to requesting clients, for example, through a front end server. Responding to a request for a stream, the delivery module either constructs the stream in real time, or accesses from a stream repository some or all of a stream that has already been generated. The streams can include one or more message threads. The delivery module stores generated streams in the stream repository. An account holder may request any of their own streams, or the streams of any other account that they are permitted to access based on security settings. If a stream includes a large number of messages, the delivery module generally identifies a subset of the messages to send to a requesting client, in which case the remainder of the messages are maintained in a stream repository and sent upon client request.

FIGS. 2A-2D illustrate example user interfaces and steps for batch-generating a message thread on a social messaging platform.

Figure 2A:
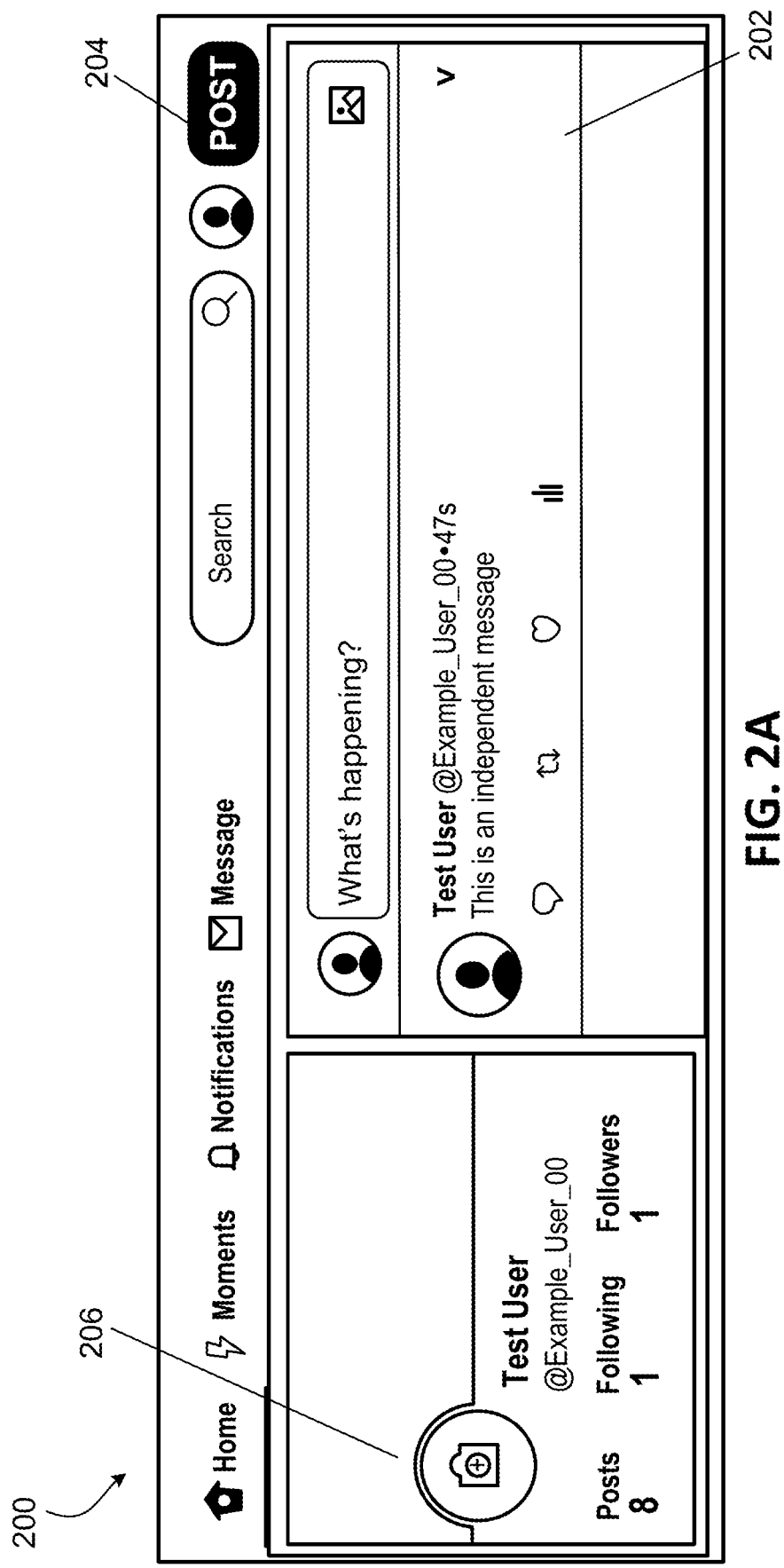
FIGS. 2A-2D illustrate example user interfaces and steps for batch-generating a message thread on a social messaging platform.

FIG. 2A is an example user interface of a homepage 200 provided by a social messaging platform, e.g., social messaging platform 100. For example, the homepage 200 can be generated when the user logs into the social messaging platform. The homepage 200 can include a timeline window 202 displaying messages published by the user and connected accounts, e.g., accounts from which the user has chosen to receive messages. Messages in the timeline window 202 can be organized in different manners as specified by the user. For example, messages can be organized in reverse chronological order according to the time of publication or be organized in a custom order specified by the user. Each message presented in the timeline window 202 can include one or more of message content, author information, timestamp, and various other statistics, e.g., engagement data including a number of replies to the message, a number of rebroadcasts of the message, or a number of message endorsements by users of the social messaging platform.

The homepage 200 can further include a user profile window 206 displaying the user's profile information. For example, the user profile window 206 can display information including one or more of the user's profile picture, the user's account name, the number of the user's connections, or the number of the user's posted messages.

The homepage 200 can further include a selectable message generation button 204. If the user selects the message generation button 204, a message composition window can be generated and provided to the user by the social message platform.

Figure 2B:
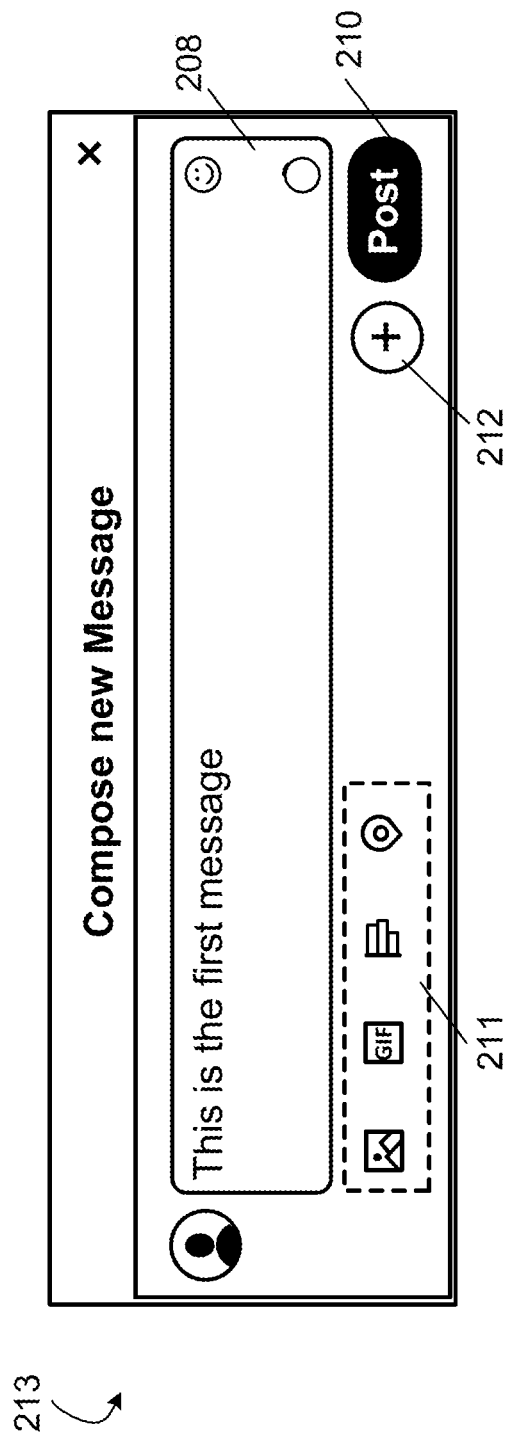

FIG. 2B shows an example user interface of the message composition window 213, displayed in response to a selection of the message generation button 204. For example, the message composition window 213 can include a message edit box 208, a post button 210, and an append button 212.

In some implementations, the message edit box 208 allows the user to input and edit text content for the composed message. The social messaging platform can impose a word limit on each individual message posted on the platform. For example, the message edit box 208 can display in real-time the number of remaining characters available for the message. The user can optionally attach media content to the message by selecting one or more of media buttons 211 to upload media content including, e.g., pictures, GIFs, videos, charts, emoji characters, or location information.

In some implementations, the user can post the composed message to the platform by selecting the publication button 210. If the user has entered a valid message in the message edit box 208 and selects the publication button 210, the message composition window 213 closes and the user is brought back to the homepage 200. The message can be added to a respective message stream of one or more users that have a predefined graph relationship with the user, e.g., as followers of the user. In some examples, if a receiving user views their homepage, the message may appear in the timeline window along with other messages in that receiving user's message stream.

In some implementations, the user can set the privacy status of a message. For example, the user can set the message to be private so that the message will only be posted to the message streams of a specified group of the user's followers. In another example, the user can send a direct private message to another user.

Figure 2C:
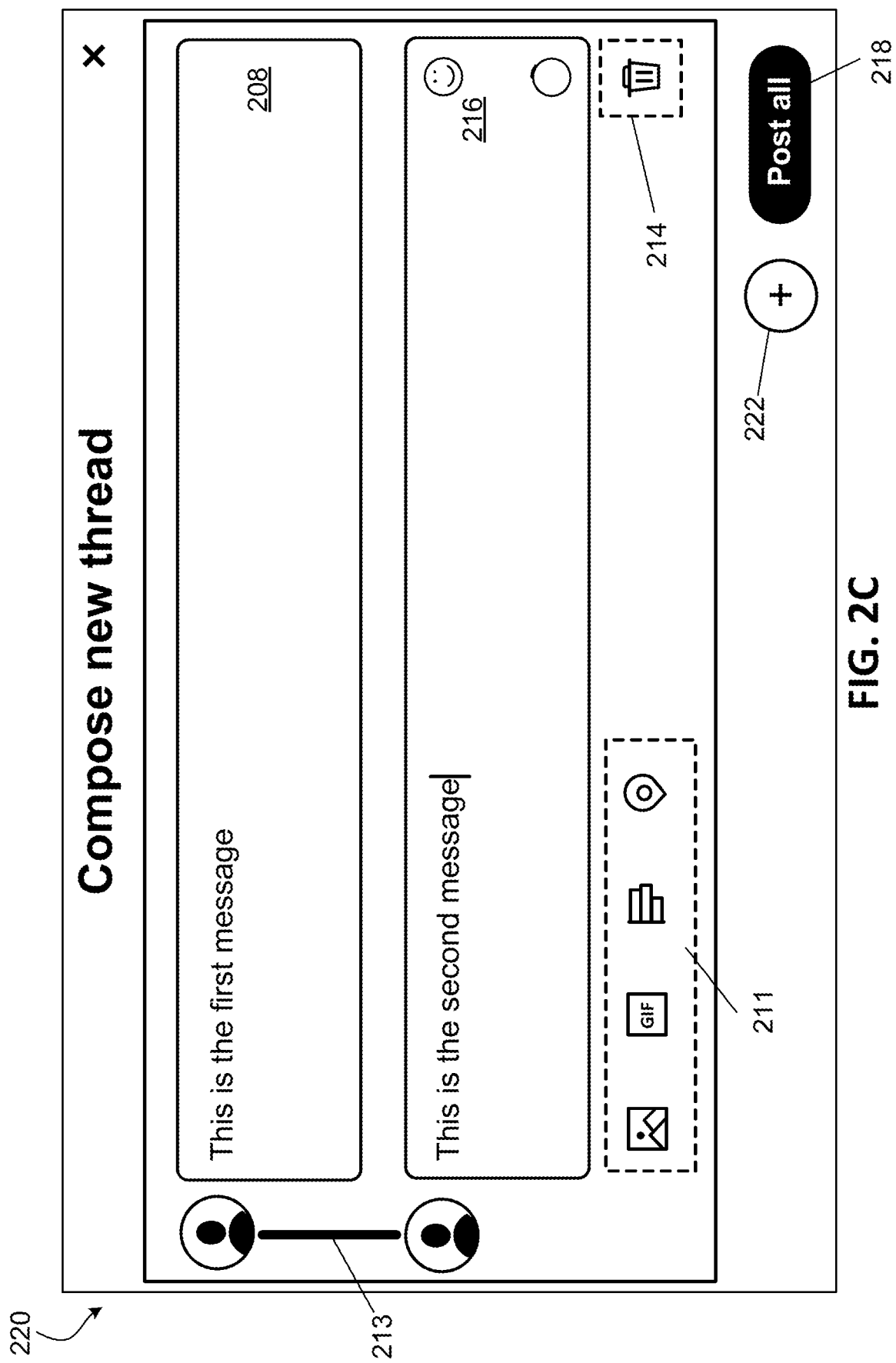

FIG. 2C shows an example thread composition window 220 displayed in response to a selection of the append button 212 in FIG. 2B.

The thread composition window 220 includes multiple message edit boxes 208 and 216, an append button 222, a delete button 214, and a post thread button 218. In FIG. 2C, the user has entered in the message edit box 208 a message "This is the first message," and in the message edit box 216 another message "This is the second message."

The thread composition window 220 includes a graphical user element 213 indicating that the first message and the second message are associated with each other. For example, indicating that the second message will be posted as a reply to the first message.

In some implementations, the user can delete, reorganize, or edit one or more messages in the thread. For example, the user can remove a message by selecting the corresponding message edit box and the delete button 214.

In some implementations, the user can attach additional messages to the thread by selecting the append button 222 in the thread composition window 220. In response to the selection, an additional message edit box can appear in the thread composition window 220 allowing the user to add an additional reply message to the thread.

When the user finishes entering messages, the user can select the post thread button 218 to post the entire message thread. If the user selects the thread publication button 218, the thread composition window 220 will disappear and the timeline window 202 reappears. The posted thread can be presented in the timeline window 202 in a similar manner to how it will appear in the timeline of users that receive the thread in their respective message streams.

Figure 2D:
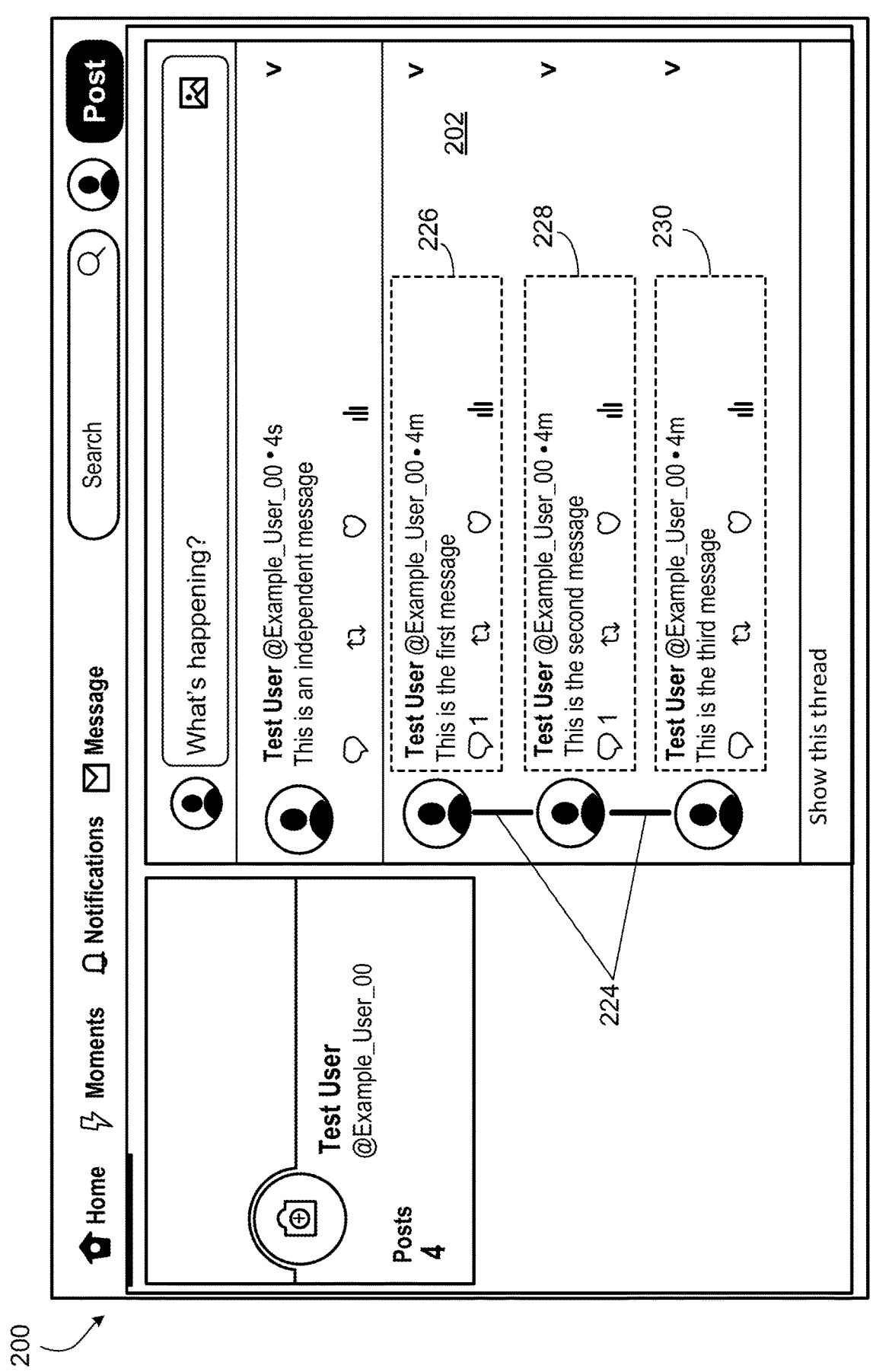

FIG. 2D shows an example user interface 200 with a published thread in timeline window 202. The message thread includes a message 226, a message 228, and a message 230. For example, the message 228 is a reply to the message 226, the message 230 is a reply to the message 228, and the message 226 is the root message of the message thread.

A user interface element 224 indicates the association of messages in a message thread. For example, the user interface element 224 can connect the message 226, the message 228, and the message 230 indicating that messages are part of a message thread and particularly that messages 228 and 230 are reply messages. A "show this thread" element can be selected such that the thread is shown in a separate window, e.g., as an overlay to the homepage 200.

In some implementations, a user can select the displayed thread in their timeline window and attach additional messages to the thread. Thus, for example, a user may realize that they want to add additional content that they didn't include during the thread composition and can subsequently add that content to the posted thread.

Figure 3A:
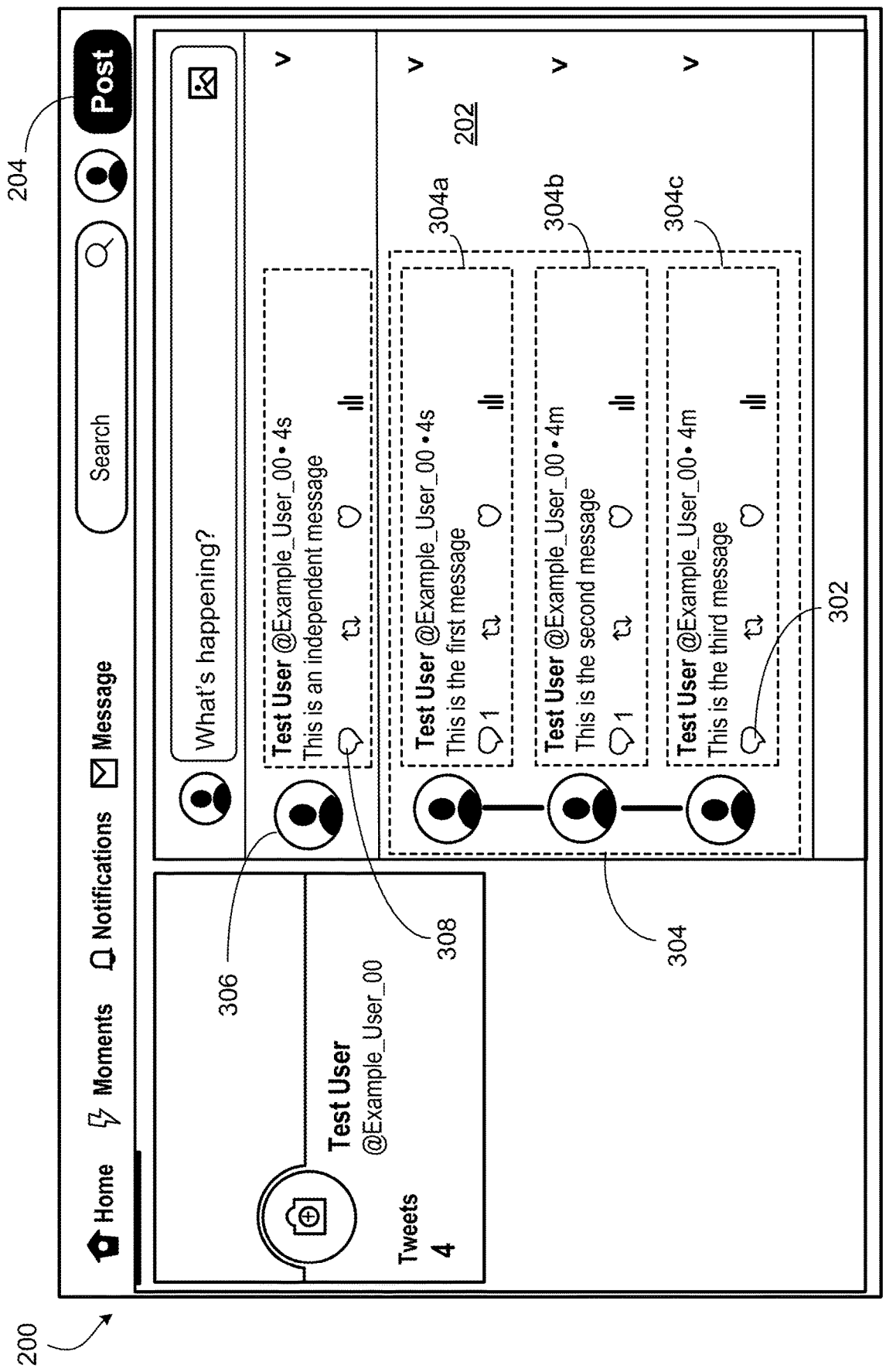
FIGS. 3A-3B illustrate example user interfaces and steps for generating a message thread by appending individual reply messages on a social messaging platform.
Figure 3B:
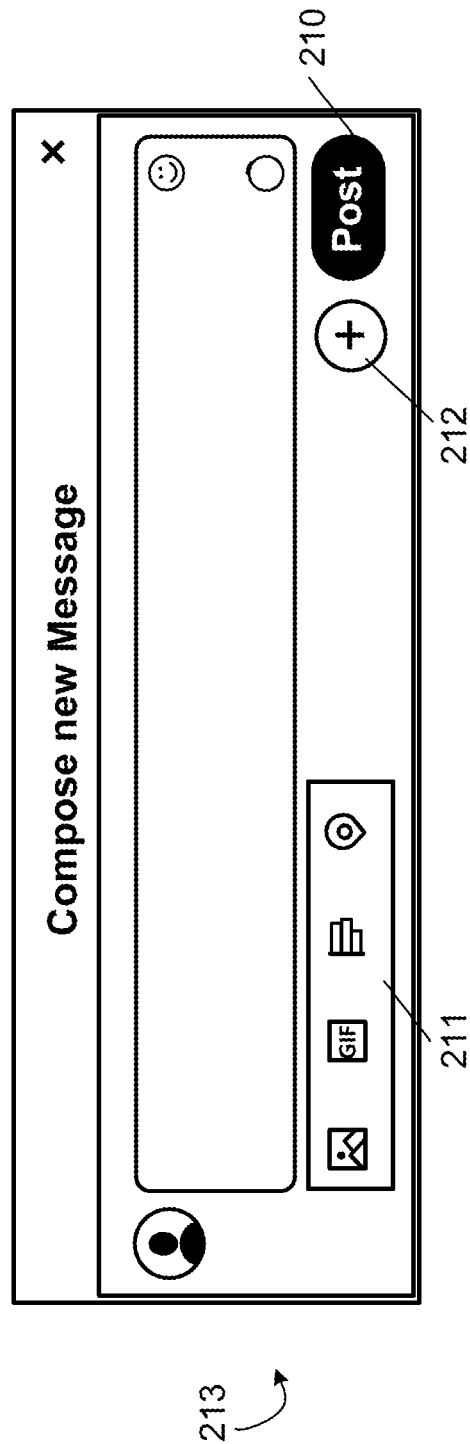

FIGS. 3A-3B show example user interfaces and steps for generating a message thread by replying to individual messages.

FIG. 3A shows the homepage 200 with the timeline window 202 displaying a single message 306 and a message thread 304. The message thread 304 includes three individual messages: message 304a, message 304b, and message 304c. The message 304b is a reply to the message 304a, and the message 304*c* is a reply to the message 304*b*. The message 304*a*, message 304*b*, and message 304*c* are published by the same user "Test User."

In some implementations, an authoring user of the message thread 304 can append a new message to the existing message thread by replying to a message in that message thread. For example, the user can select a reply button 302 associated with the message 304*c* to add one or more new replies as additional messages to the message thread. In response to the selection, the message composition window 213 of FIG. 3B appears and allows the user to compose and post a message as a reply to the message 304*c*. The user can attach additional messages to the message thread by selecting the append button 212 in the message composition window 213. As a result of the selection, a thread composition window similar to that in FIG. 2C can appear. If the user finishes entering and editing a message, the user can select the post button 210 to publish the new message as part of the message thread 304.

In some implementations, the user can create a new message thread by replying to an individual message authored by the user. For example, the user can select the reply button message 308 associated with the message 306 to create a new message thread with the message 306 being the root message. In response to the selection, the message composition window 213 will appear, allowing the user to enter and edit additional messages for the new message thread. The social messaging platform 100 can identify reply messages by, for example, checking a message's metadata, and grouping self-reply messages with corresponding root messages to be of the same message thread.

Figure 4A:
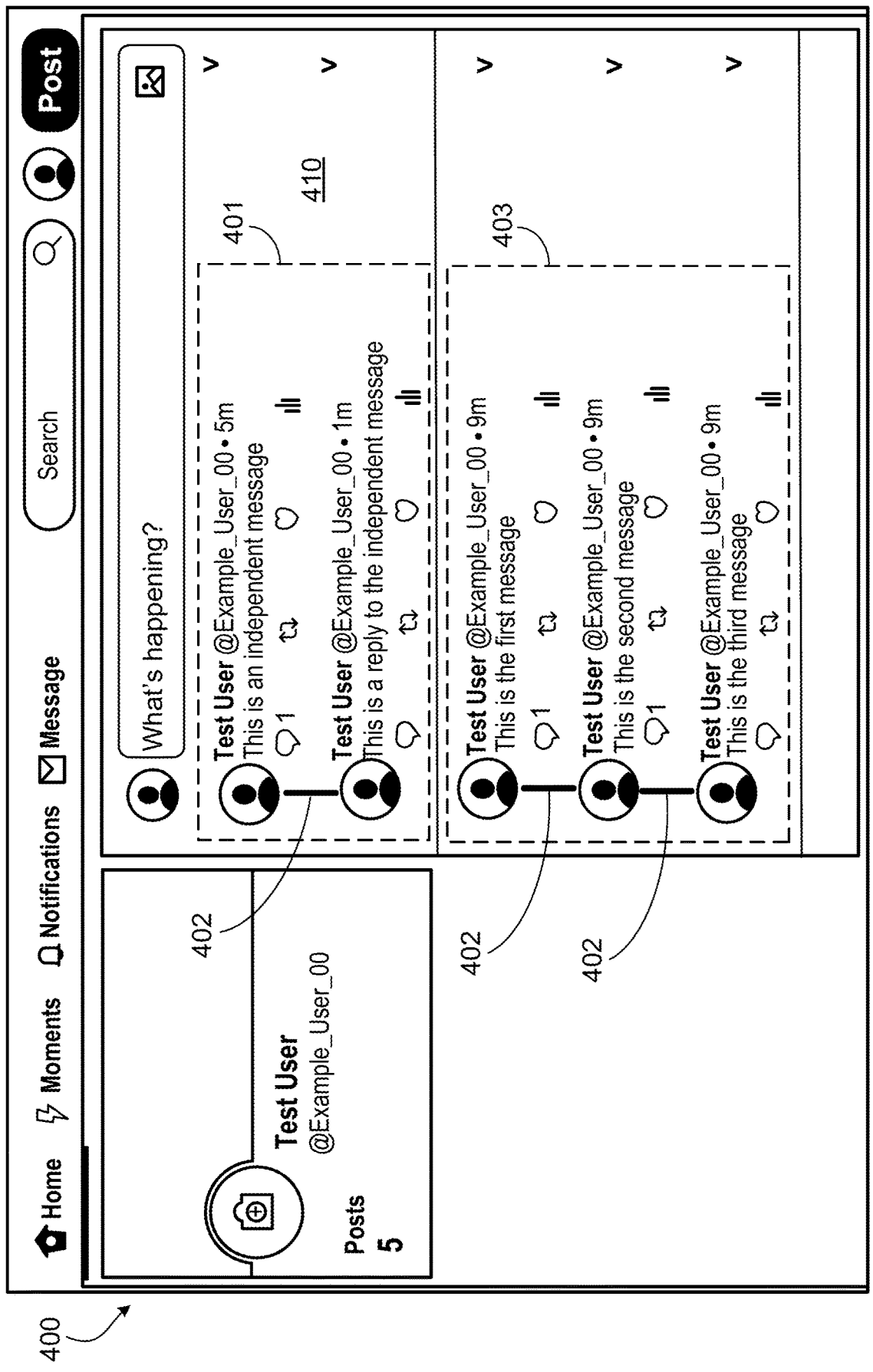
FIGS. 4A-4B are example user interfaces for displaying a message thread on a social messaging platform.
Figure 4B:
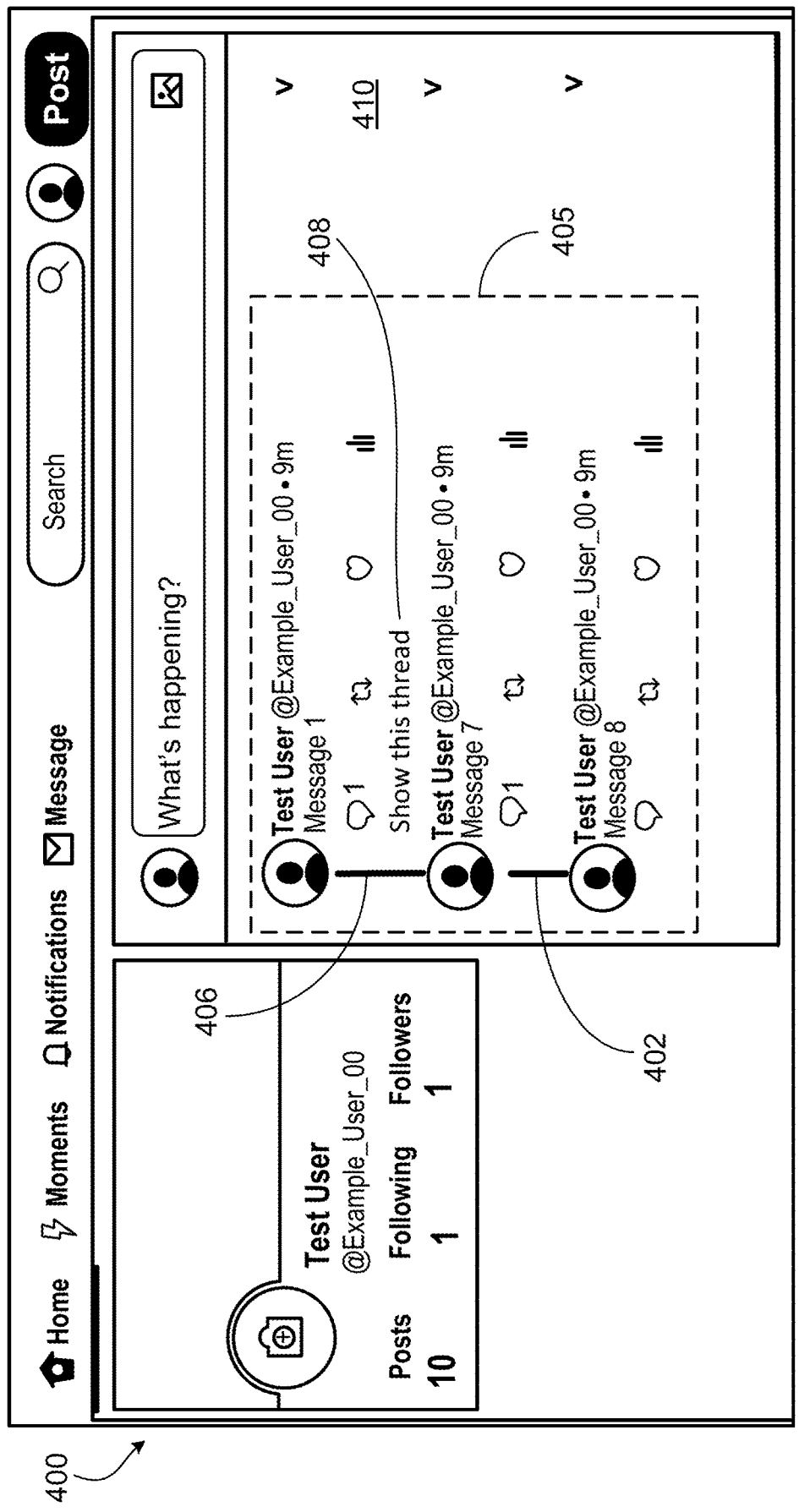

FIGS. 4A-4B are example user interfaces for displaying a message thread on a social messaging platform.

In FIG. 4A a message thread 401 and a message thread 403 are shown in a timeline window 410 of homepage 400. As shown in timeline window 410, messages belonging to the same message thread are grouped and displayed as a single unit on a timeline with a particular user interface element. For example, the message thread 401 includes a first message "This is an independent message" and a second message "This is a reply to the independent message." A user interface element 402 provides visual affordance connecting the first and the second messages in the message thread 401. Similarly, the message thread 403 includes a first message "This is the first message," a second message "This is the second message," and a third message "This is the third message." Multiple user interface elements 402 provide visual affordance indicating that these messages are associated with each other in the message thread 403.

In some implementations, the user interface element 402 provides additional information, e.g., the numbering of messages, the type of messages, e.g., root v. reply, or a timestamp.

In. FIG. 4B a collapsed message thread 405 is shown in the timeline window 410 of homepage 400. In some implementations, a message thread can be collapsed if the number of messages in the message thread exceeds a specified number. Collapsing a message thread allows content diversity in the overall timeline and simplifies timeline display. For example, only the first (root) message and the last two messages of the message thread 405 are displayed in the timeline window 410. A user interface element 406 indicates the existence of additional messages in the thread and a selectable user interface element 408 allows the user to display all messages in the message thread 405.

FIGS. 5A-5D illustrate example message threads having different structures. Users of the message platform can construct these message threads by using the batch-generation method as described in FIG. 2 or by replying to individual messages as described in FIG. 3.

A message thread is composed of a series of self-reply messages by the same user on the social messaging platform. Each message thread includes a root message and one or more reply messages authored by the same user. The root message is the first message in a message thread and can be an independent message (a message that does not reply to any other message) or a reply message. Each of the one or more reply messages is a reply to another message (the root message or another reply message) in the message thread.

In some implementations, the social messaging platform uses metadata to label and organize message threads. For example, messages indexed on the social messaging platform can be associated with metadata including (1) a message identifier (ID), (2) an author ID, and (3) a reply-to ID. Specifically, the message ID can be a unique identifier assigned to each message posted on the social messaging platform. The author ID can be a unique identifier assigned to each account of the social messaging platform. The reply-to ID can be a unique identifier assigned to each reply message identifying another message to which the reply message replies. A message thread can include a series of replies where each subsequent reply is a reply to the immediately preceding message. In some other implementations, the message thread includes multiple branches. For example, the user can post multiple messages as replies to a single message in the message thread.

FIG. 5A shows a first type of message thread with an independent root message and no branches. Message 0 is an independent root message as it does not reply to any other messages. Message 1 replies to message 0, message 2 replies to message 1, and message 3 replies to message 2. Each message is posted by the same user, Author: A. Message 0, message 1, message 2, and message 3 form a message thread with an independent root message 0 and sequential self-replies to each subsequent message.

The user can add to the message thread by creating new replies. For example, the user can post additional replies to message 3 to grow the message thread.

FIG. 5B shows a second type of message thread with a dependent root message and no branches. Message 1 by author A is a reply to message 0 by author B. Message 2 by author A is a reply to message 1, and message 3 by author A is a reply to message 2. Since message 0 is from a different user, the message thread only includes message 1, message 2, and message 3.

A message thread of this type can appear, for example, when a user reads a message by another user and posts a series of messages as replies.

Figures 5C, 5D:
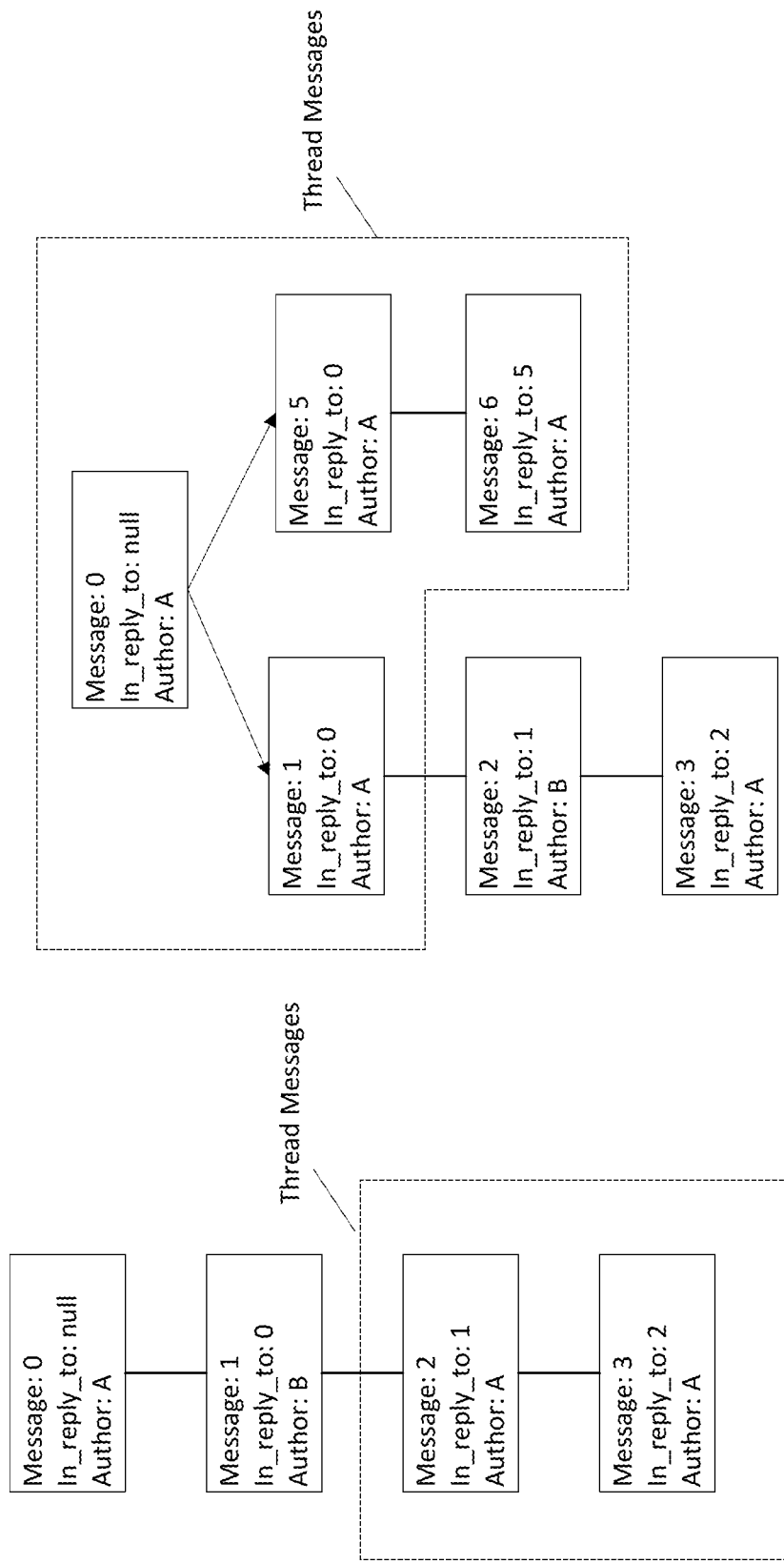

FIG. 5C shows a third type of message thread with a dependent root message and no branches. Message 1 by author B is a reply to message 0 by author A. Message 2 by author A is a reply to message 1, and message 3 by author A is a reply to message 2. Since message 0 is separated from message 2 by message 1, the message thread includes only message 2 and message 3.

A message thread of this type can appear, for example, when a user posts a series of messages as replies to comments by another user.

In some implementations, a message thread can include multiple branches. FIG. 5D shows a fourth type of message thread with an independent message thread and a branch. Message 1 and message 5 are both replies to message 0. Message 6 is a reply to message 5. Message 2 by a different author (author B) is a reply to message 1, and message 3 is a reply to message 2. Since message 3 is separated from message 1, the message thread includes only message 0, message 1, message 5, and message 6.

A message thread of this type can appear, for example, when a user uses a single message (message 0) to develop two different types of responses.

In some implementations, the social messaging platform does not include branches are part of a message thread. For example, the message thread can include only the oldest non-branching message thread. If a later-in-time message replies to another message in the middle of a message thread or the root message, then the branch formed by the later-in-time message is ignored. Consequently, the only message thread formed in FIG. 5D may is the message thread including message 0 and message 1, assuming that message 5 comes later in time than message 1. In another example, the message thread may include only the longest branch. According to this logic, the message thread recognized in FIG. 5D includes message 0, message 5, and message 6. When a later new reply message is created, the recognized message thread may change depending on the position of the new reply message in the thread.

In some other implementations, the social messaging platform can assign a unique thread identifier to each message thread. For example, each message belonging to a message thread can have an additional metadata field corresponding to the unique thread identifier. In another example, the unique thread identifier can also indicate the type of message thread based on predefined nomenclature. Each message in a message thread can have additional metadata fields. For example, a message can have a metadata field showing its position in the message thread.

Figure 6:
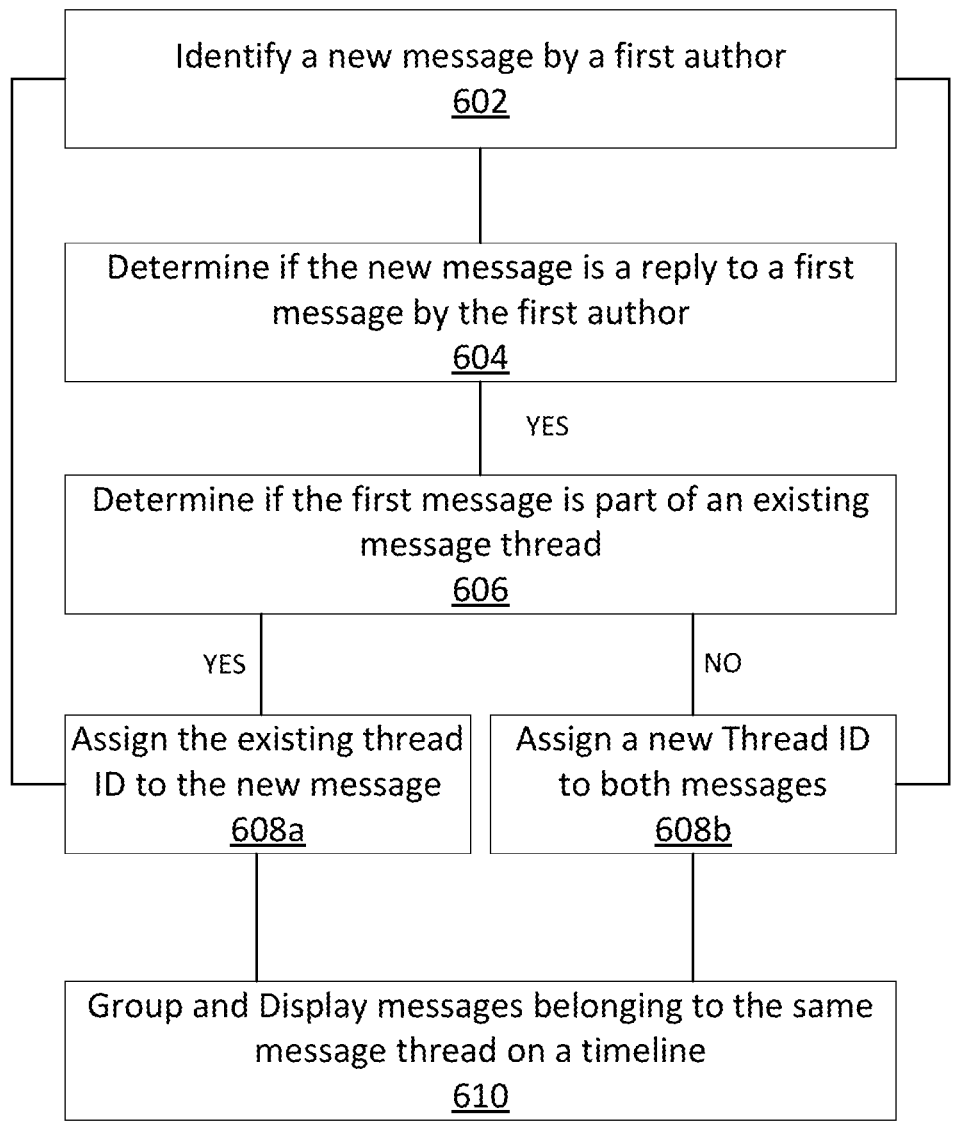
FIG. 6 is a flowchart of an example process for identifying and displaying self-replying message threads on a social messaging platform.

FIG. 6 is a flowchart of an example process for identifying and displaying a message thread on the social messaging platform. In particular, the social messaging platform monitors new messages posted on the social messaging platform and adds, for example, to a message repository, e.g., the message repository 140 of FIG. 1, for each user and automatically constructs and updates message threads.

For convenience, the process will be described as being performed by a system of one or more computers located in one or more locations. For example, a distributed computing system appropriately programmed to implement the social messaging platform 100 described in FIG. 1, can perform the process.

The system identifies a new message by a first author (602). For example, the user can post a new message to the message platform or reply to an existing message on the user timeline. The system can identify each message on the social messaging platform as a data object with a metadata and message content. Example metadata can include those described above with respect to FIG. 4, message ID, author ID, and reply-to ID, as well as message thread-related metadata.

The message thread-related metadata can further include a message thread ID and an "isLeaf" Boolean value. The message thread ID has the same value as the message ID metadata of the root message in the message thread, and the isLeaf Boolean value indicates whether a message in the message thread is a leaf (i.e. not the root message). Message metadata and content can be stored in a message repository, e.g. the message repository 140, for example, as part of an message index that includes metadata for each stored message. A logic computation unit, e.g. the content analysis module 116, can compare, filter, rank, organize, or perform other operations on messages using message metadata.

The system determines if the new message is posted as a reply to a first message by the same author (604). To do this, the system can first compare the new message's reply-to ID metadata to the first message's message ID metadata. If the reply-to ID of the new message does not match the message ID of the first message, then the two messages do not maintain a reply-to relation and are not part of the same message thread. If the reply-to ID matches the message ID, then the system can further compare the new message's author ID to the first message's author ID. If the two author IDs match, then the new message is a reply to the first message and they can be part of the same message thread. The system can perform the comparison using a logic computation unit, e.g. the content analysis module 116.

If the new message replies to and shares an author with the first message, then the system further determines if the first message is part of an existing message thread (606). For example, the system can request the message repository to return the first message's message thread metadata If the system receives a null value after requesting the first message's message thread metadata, then the first message, prior to the reply of the new message, is not yet part of a message thread. As a result, the system generates and assigns to the first message new message thread metadata. This can be a unique thread identifier, or, in some implementations, the message thread ID has the same value as the first message's message ID. Additionally, the system sets the value of the isLeaf Boolean to false. The system next assigns message thread metadata to the new message, e.g., with the message thread ID having the same value as the first message's message thread ID (also the same value as the first message's message ID), and the isLeaf Boolean value is set to true. Therefore, the system generates a new message thread with the first message as the root message and the new message as the first reply message (608*a*).

If the system receives a valid value for the first message's metadata, then the first message is part of an existing message thread. The system can request additional information related to the message thread, e.g. the message thread ID and isLeaf Boolean value of the first message, and assign the metadata to the new message. Therefore, the new message becomes the latest addition to an existing message thread including the first message (608*b*).

In response to a user request, the system generates a timeline that includes the message thread for display (610). For example, the messages of the thread can be organized in chronological order, with the most recent replies displayed on the bottom of the message thread. The messages can also be displayed with visual affordance indicating that the messages are part of a message thread and may be compressed to only show a portion of the message thread.

In some implementations, the system includes functionality to prevent message thread branching. For example, when there exist multiple replies to the same message in a message thread, the system only recognizes the branch with the maximum depth as the message thread and set the appropriate metadata fields. The messages, based on reply-to relations, can for a message tree with multiple branches, and the system can use a traversal algorithm, e.g. depth-first search, to identify the longest branch in the message tree. In another example, the system can include only the first-in-time replies in a message thread, e.g., if there are multiple replies to a message, the system only recognizes the earliest message as part of the message thread.

In some implementations, the system includes functionality to allow a user to share, quote, or comment on a message thread. For example, a user can share, quote, or comment on an individual message of the message thread, and a visual affordance will indicate that this message is part of a message thread. Other users who receive this single message can choose to read the entire message thread.

Embodiments of the subject matter and the operations described in this document can be implemented in digital electronic circuitry, or in computer software, firmware, or hardware, including the structures disclosed in this document and their structural equivalents, or in combinations of one or more of them. Embodiments of the subject matter described in this document can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this document can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or another unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this document can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this document can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this document, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
receiving a plurality of messages posted to a social messaging platform by a first user account;
determining messages of the plurality of messages that belong to a self reply thread of messages posted by the first user account;
assigning a thread identifier to each of the messages that belong to the self reply thread, the thread identifier associating each of the messages with the self reply thread;
receiving a request from a user device to provide a message timeline to a second user account of the social messaging platform, wherein the message timeline includes a plurality of messages including messages of the self reply thread; and
in response to the request, transmitting, to the user device, a plurality of messages of the message timeline, wherein the plurality of messages are ordered according to particular criteria, wherein messages of the self reply thread are grouped together in the order, wherein the user device is configured to present the message timeline to a user, and wherein presenting the message timeline comprises presenting a plurality of individual messages, presenting a first message of the self reply thread, a second message of the self reply thread, and a visual representation identifying the self reply thread.

2. The method of claim 1, wherein determining messages that belong to the self reply thread includes determining that a first message is part of an existing self reply thread comprising evaluating thread-related metadata of the first message including the message thread identifier and an isLeaf value, wherein the message thread identifier corresponds to a message identifier of a root message of the self reply thread and the isLeaf indicates whether the first message is a leaf of the self reply thread.

3. The method of claim 2, wherein determining whether a second message is a reply to the first message by the first user account comprises:
obtaining a reply-to identifier associated with the second message;
obtaining a message identifier of the first message;
comparing the reply-to identifier with the message identifier; and
comparing a message author identifier of the second message to a message author identifier of the first message.

4. The method of claim 3, further comprising:
determining that a third message of the plurality of messages is a self reply directly to the first message; and
assigning the thread identifier of the first and second message to the third message such that the resulting self reply thread includes branching in the same self reply thread.

5. The method of claim 1, wherein the visual representation comprises a compressed representation of the self reply thread in response to determining that the number of messages in the self reply thread exceeds a specified number.

6. The method of claim 1, wherein the visual representation corresponds to a line that links the first message to another message of the self reply thread.

7. The method of claim 1, wherein the self reply thread only includes the self reply messages posted by the first user account and does not include other replies to messages of the self reply thread by other user accounts of the messaging platform.

8. The method of claim 1, wherein the plurality of messages includes multiple replies to a same message posted by the first account, the determining messages that belong to the self reply thread further comprising:
determining a branch of replies having a maximum depth of self replies; and
assigning the self reply thread to the branch having the maximum depth.

9. A system comprising one or more computers and one or more storage devices storing instructions that when executed by the one or more computers cause the one or more computers to perform operations comprising:

receiving a plurality of messages posted to a social messaging platform by a first user account;

determining messages of the plurality of messages that belong to a self reply thread of messages posted by the first user account;

assigning a thread identifier to each of the messages that belong to the self reply thread, the thread identifier associating each of the messages with the self reply thread;

receiving a request from a user device to provide a message timeline to a second user account of the social messaging platform, wherein the message timeline includes a plurality of messages including messages of the self reply thread; and in response to the request, transmitting, to the user device, a plurality of messages of the message timeline, wherein the plurality of messages are ordered according to particular criteria, wherein messages of the self reply thread are grouped together in the order, wherein the user device is configured to present the message timeline to a user, and wherein presenting the message timeline comprises presenting a plurality of individual messages, presenting a first message of the self reply thread, a second message of the self reply thread, and a visual representation identifying the self reply thread.

10. The system of claim 9, wherein determining messages that belong to the self reply thread includes determining that a first message is part of an existing self reply thread comprising evaluating thread-related metadata of the first message including the message thread identifier and an isLeaf value, wherein the message thread identifier corresponds to a message identifier of a root message of the self reply thread and the isLeaf indicates whether the first message is a leaf of the self reply thread.

11. The system of claim 10, wherein determining whether a second message is a reply to the first message by the first user account comprises:

obtaining a reply-to identifier associated with the second message;

obtaining a message identifier of the first message;

comparing the reply-to identifier with the message identifier; and comparing a message author identifier of the first message to a message author identifier of the second message.

12. The system of claim 11, wherein the visual representation comprises a compressed representation of the self reply thread in response to determining that the number of messages in the self reply thread exceeds a specified number.

13. The system of claim 9, further storing instructions that when executed by the one or more computers cause the one or more computers to perform operations comprising:

determining that a third message of the plurality of messages is a self reply directly to the first message; and assigning the thread identifier of the first and second message to the third message such that the resulting self reply thread includes branching in the same self reply thread.

14. The system of claim 9, wherein the visual representation corresponds to a line that links the first message to another message of the self reply thread.

15. The system of claim 9, wherein the self reply thread only includes the self reply messages posted by the first user account and does not include other replies to messages of the self reply thread by other user accounts of the messaging platform.

16. The system of claim 9, wherein the plurality of messages includes multiple replies to a same message posted by the first account, the determining messages that belong to the self reply thread further comprising:

determining a branch of replies having a maximum depth of self replies; and assigning the self reply thread to the branch having the maximum depth.

17. One or more non-transitory computer storage media encoded with a computer program, the computer program storing instructions that when executed by one or more computers cause the one or more computers to perform operations comprising:

receiving a plurality of messages posted to a social messaging platform by a first user account;

determining messages of the plurality of messages that belong to a self reply thread of messages posted by the first user account;

assigning a thread identifier to each of the messages that belong to the self reply thread, the thread identifier associating each of the messages with the self reply thread;

receiving a request from a user device to provide a message timeline to a second user account of the social messaging platform, wherein the message timeline includes a plurality of messages including messages of the self reply thread; and in response to the request, transmitting, to the user device, a plurality of messages of the message timeline, wherein the plurality of messages are ordered according to particular criteria, wherein messages of the self reply thread are grouped together in the order, wherein the user device is configured to present the message timeline to a user, and wherein presenting the message timeline comprises presenting a plurality of individual messages, presenting a first message of the self reply thread, a second message of the self reply thread, and a visual representation identifying the self reply thread.

18. The one or more non-transitory computer storage media of claim 17, wherein determining messages that belong to the self reply thread includes determining that a first message is part of an existing self reply thread comprising evaluating thread-related metadata of the first message including the message thread identifier and an isLeaf value, wherein the message thread identifier corresponds to a message identifier of a root message of the self reply thread and the isLeaf indicates whether the first message is a leaf of the self reply thread.

19. The one or more non-transitory computer storage media of claim 18, wherein determining whether a second message is a reply to the first message by the first user account comprises:

obtaining a reply-to identifier associated with the second message;

obtaining a message identifier of the first message;

comparing the reply-to identifier with the message identifier; and comparing a message author identifier of the second message to a message author identifier of the first message.

20. The one or more non-transitory computer storage media of claim 19, further storing instructions that when executed by the one or more computers cause the one or more computers to perform operations comprising:

determining that a third message of the plurality of messages is a self reply directly to the first message; and assigning the thread identifier of the first and second message to the third message such that the resulting self reply thread includes branching in the same self reply thread.

21. The one or more non-transitory computer storage media of claim 17, wherein the visual representation comprises a compressed representation of the self reply thread in response to determining that the number of messages in the self reply thread exceeds a specified number.

22. The one or more non-transitory computer storage media of claim 17, wherein the visual representation corresponds to a line that links the first message to another message of the self reply thread.

23. The one or more non-transitory computer storage media of claim 17, wherein the self reply thread only includes the self reply messages posted by the first user account and does not include other replies to messages of the self reply thread by other user accounts of the messaging platform.

24. The one or more non-transitory computer storage media of claim 17, wherein the plurality of messages includes multiple replies to a same message posted by the first account, the determining messages that belong to the self reply thread further comprising:
  determining a branch of replies having a maximum depth of self replies; and
  assigning the self reply thread to the branch having the maximum depth.

* * * * *